United States Patent [19]

Watanabe et al.

[11] Patent Number: 5,038,280
[45] Date of Patent: Aug. 6, 1991

[54] INFORMATION PROCESSING APPARATUS HAVING ADDRESS EXPANSION FUNCTION

[75] Inventors: Masaya Watanabe; Shuichi Abe, both of Hadano, Japan

[73] Assignee: Hitachi, Ltd., Tokyo, Japan

[21] Appl. No.: 288,270

[22] Filed: Dec. 22, 1988

[30] Foreign Application Priority Data

Dec. 28, 1987 [JP] Japan .................. 62-330239

[51] Int. Cl.[5] .......................... G06F 9/38; G06F 9/30
[52] U.S. Cl. ............................ 364/200; 364/900;
364/231.8; 364/254.5; 364/254.8; 364/254.9;
364/261.3; 364/262.81; 364/938; 364/957.6;
364/958.5; 364/961.1
[58] Field of Search ......................... 364/200, 900

[56] References Cited

U.S. PATENT DOCUMENTS

| | | | |
|---|---|---|---|
| 4,258,419 | 3/1981 | Blahut et al. | 364/200 |
| 4,530,050 | 7/1985 | Fukunaga et al. | 364/200 |
| 4,586,130 | 4/1986 | Butts, Jr. et al. | 364/200 |
| 4,616,313 | 10/1986 | Aoyagi | 364/200 |
| 4,734,849 | 3/1988 | Kinoshita et al. | 364/200 |

FOREIGN PATENT DOCUMENTS 60-142742 6/1985 Japan .

*Primary Examiner*—Allen R. MacDonald
*Assistant Examiner*—Glenn A. Auve
*Attorney, Agent, or Firm*—Antonelli, Terry, Stout & Kraus

[57] ABSTRACT

An information processing apparatus having address expansion function for changing over the address width of instructions and operands comprises latch means storing therein an address mode and having contents updated in accordance with the address modes of succedding instructions including an instruction of branch destination for a branch instruction. When an address mode changeover instruction of branch type is executed, fetch of a train of instructions of branch destination in advance is performed in accordance with the address mode stored in the latch means, and operand fetch synchronized to instruction decoding is performed in accordance with the address mode stored in the latch means. Further, there is provided an operand refetch address queue for performing refetch in case operand fetch is not accepted by a memory. Corresponding to each refetch address of the queue, the address mode of that address is fetched from the latch means and stored. Each operand refetch is performed in accordance with the address mode to specified in that refetch.

3 Claims, 4 Drawing Sheets

FIG. 4A
(PRIOR ART)

| CYCLE | | 1 | 2 | 3 | 4 | 5 | 6 | 7 | 8 | 9 | 10 | 11 | 12 |
|---|---|---|---|---|---|---|---|---|---|---|---|---|---|
| IF | Di | ② | | | | | | | | | | | |
| | Ai | | ○ | | | | | | | | | | |
| | Li | | | ○ | | | | | | | | | |
| OF | D | ① | | | ○ | | | ② | | | | | |
| | A | | ○ | | | | | | ○ | | | | |
| | L | | | ○ | | | | | | ○ | | | |
| | E | | | | | ① | ① | ① | | | ② | | |

FIG. 4B

| CYCLE | | 1 | 2 | 3 | 4 | 5 | 6 | 7 | 8 | 9 | 10 | 11 | 12 |
|---|---|---|---|---|---|---|---|---|---|---|---|---|---|
| IF | Di | ② | | | | | | | | | | | |
| | Ai | | ○ | | | | | | | | | | |
| | Li | | | ○ | | | | | | | | | |
| OF | D | ① | | | ② | | | | | | | | |
| | A | | ○ | | | ○ | | | | | | | |
| | L | | | ○ | | | ○ | | | | | | |
| | E | | | | | ① | ① | ② | | | | | |

FIG. 5A
(PRIOR ART)

| CYCLE | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| IF MODE | | A | B | ← | | | | | | | | | | → | B |
| IF | Di | | (IF) | | | | | | | | | | | | |
| | Ai | | | ○ | | | | | | | | | | | | |
| | Li | | | | ○ | | | | | | | | | | | |
| OF MODE | | A | ← | | | | | | | | → A | B | ← | | B |
| OF | D | ① | ② | | ① | ② | | | | | | ③ | | | |
| | A | | | | | ○ | ○ | | | | | ○ | | | |
| | L | | | | | ○ | ○ | | | | | | ○ | | |
| | E | | | | | | ① | ② | ② | ② | | | | | ③ |

FIG. 5B

| CYCLE | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| IF MODE | A | B | ← | | | | | | | | | | → | B |
| IF | | ○ | | | | | | | | | | | | |
| | | | ○ | | | | | | | | | | | |
| | | | | ○ | | | | | | | | | | |
| OF MODE | A | A | B | A | A | B | ← | | | | | | → | B |
| OF | ① | ② | | ① | ② | ③ | | | | | | | | |
| | | | | | ○ | ○ | ○ | | | | | | | |
| | | | | | | ○ | ○ | ○ | | | | | | |
| | | | | | | | ① | ② | ② | ② | ③ | | | |

INFORMATION PROCESSING APPARATUS HAVING ADDRESS EXPANSION FUNCTION

BACKGROUND OF THE INVENTION

The present invention relates to an information processing apparatus having an address expansion function, and in particular to its address expansion control operation.

Assuming that two possible widths of address handled in a data processing system, such as an instruction address and an operand address, are 24 bits and 31 bits, for example, an instruction for changing over the address width and linking an instruction and an operand to an address routine with the address width thus changed over is provided in a data processing apparatus. This instruction is hereafter referred to as an address mode changeover instruction or simply as a mode changeover instruction.

An information processing apparatus performing the processing of the mode changeover instruction in accordance with the prior art is proposed in JP-A-60-142742. In the information processing apparatus of JP-A-60-142742, there is provided a function in which, when a mode changeover instruction of branch type is to be executed, an instruction of a branch destination is fetched before completion of the execution stage of the mode changeover instruction. However, the operand fetch with the address mode changed over cannot be performed until the execution stage of the preceding instruction is completed. Further, the operand fetch of an instruction located at a branch destination or link destination must wait until the execution state of the mode changeover instruction is completed, resulting in a problem of delayed processing in the information processing apparatus. Operand fetch requests include an operand fetch request or a decode synchronization request synchronized to decoding of an instruction specifying a memory operand and a refetch request for performing operand fetch again some time later when the decode synchronization request is not accepted by a memory unit. In the prior art, however, there is not provided means for coping with the decode synchronization request and the refetch request when the operand of an instruction of a link destination is fetched in the execution of the mode changeover instruction of a branch type.

SUMMARY OF THE INVENTION

An object of the present invention is to provide an information processing apparatus having an address expansion function, which solves the problems of the prior art and is so configured that when a mode changeover instruction or branch type instruction is to be executed, decoding of the instruction located at the destination of the link can be started immediately without waiting for the completion of the execution stage of the mode changeover instruction.

For an instruction of a branch type, in an information processing apparatus according to the present invention, the address mode of an instruction of a branch destination is stored in a latch so that the instruction of a branch destination and its succeeding instructions may be fetched in advance. For the instruction of a branch destination and its succeeding instructions, operands are fetched in synchronism with decoding of respective instructions and in accordance with the address mode stored in the above described latch. Further, an operand refetch address queue is provided for operand refetch. Address modes corresponding to respective refetch addresses of the above described queue are fetched in the first operand fetch and stored as an operand refetch address mode queue. Respective operands are thus refetched out in predetermined address modes. When an address mode changeover is performed, some refetch requests may be present in operand refetch request queue which must be performed in the mode used before the changeover. This can also be performed in the predetermined mode by providing the operand refetch address mode queue.

According to the present invention, when executing a mode changeover instruction of a branch type, it is possible to decode an instruction of a branch destination without waiting for the completion of the execution of the mode changeover instruction and hence increases the processing speed of information processing apparatuses.

BRIEF DESCRIPTION OF THE DRAWINGS

These and other objects and advantages of the present invention will become apparent by reference to the following description and accompanying drawings wherein:

FIG. 4A shows the processing flow of a mode changeover instruction of the prior art;

FIG. 4B shows the processing flow of a mode changeover instruction according to the present invention;

FIG. 5A shows the processing flow of a mode changeover instruction and an instruction of a branch destination of the prior art;

FIG. 5B shows the processing flow of a mode changeover instruction and an instruction of a branch destination according to the present invention.

DESCRIPTION OF THE PREFERRED EMBODIMENT

Prior to describing an embodiment of the present invention, a mode changeover instruction and mode changeover of the prior art will be described.

Figure 1:
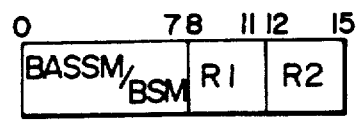
FIG. 1 shows the instruction format of a mode changeover instruction.

FIG. 1 shows the instruction format of a mode changeover instruction. As shown in FIG. 1, mode changeover instructions include two kinds of instructions, i.e., a BASSM instruction and a BSM instruction. Both of them are instructions of a branch type. The operation of the BASSM instruction is in brief as follows:

(1) Four low-order bytes of PSW (bit 0 represents the address mode and bits 1 to 31 represent the instruction address) are saved as link information into a general-purpose register specified by a general-purpose register number specifying portion $R_1$ of the BASSM instruction; and (2) Among four bytes of a general-purpose register number specifying portion $R_2$ of the BASSM instruction, bit 0 is set as a new address mode and bits 1 to 31 are set as a new instruction address.

By these instructions, the apparatus operates in accordance with the address mode thus newly set, inclusive of an address of a branch destination. The operation of the BSM instruction is the same as that of the BASSM instruction excepting that only an address mode is set in bit 0 of the general-purpose register specified by $R_1$ in the above paragraph (1), and bits 1 to 31 remain unchanged.

Figure 2:
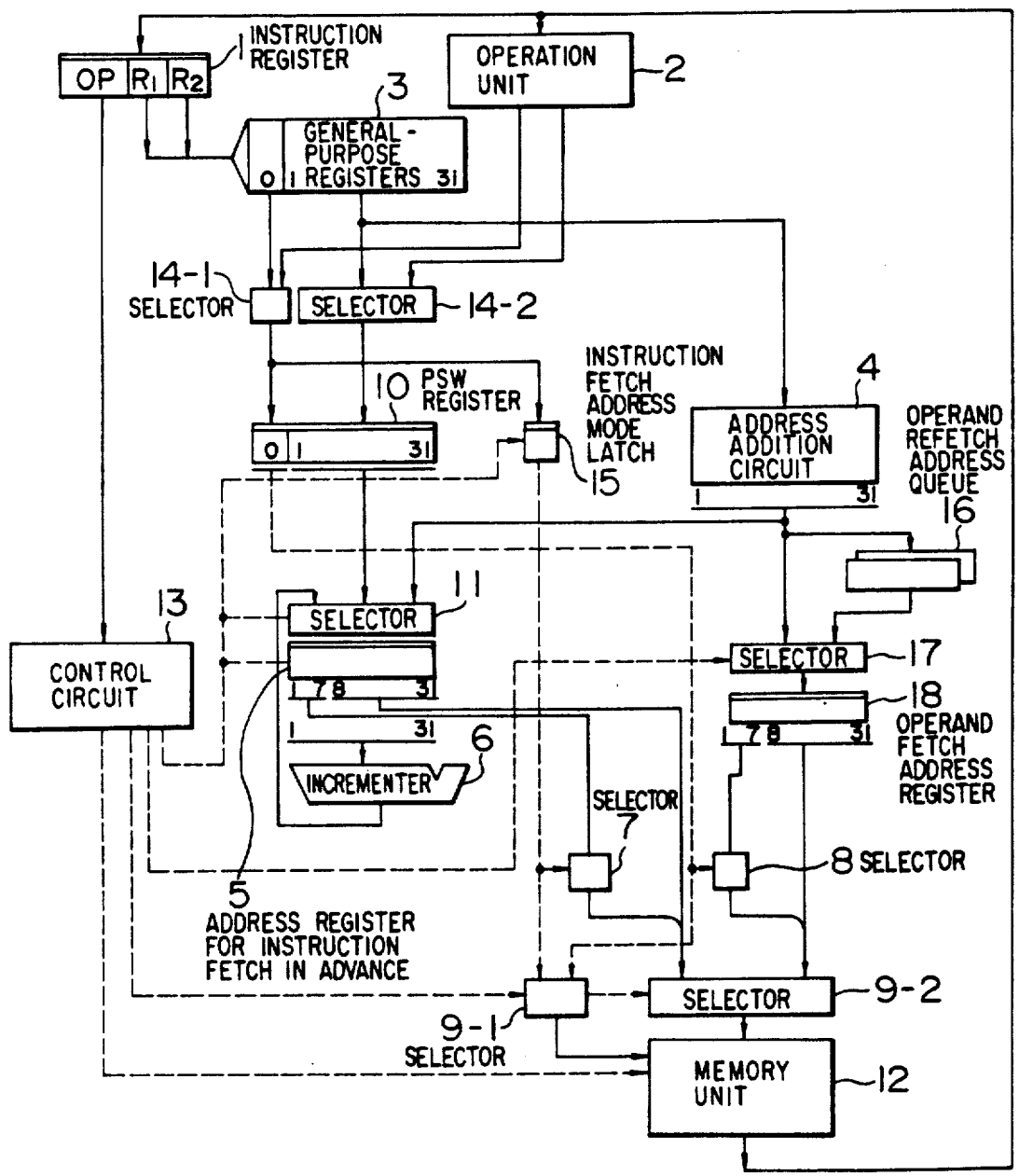
FIG. 2 shows the configuration of a conventional information processing apparatus having an address expansion function.

As the prior art relating to an information processing apparatus which performs processing of instructions including an address mode setting, a technique such as those described in JP-A-60-142742 will now be described by referring to the drawings. In FIG. 2, numeral 1 denotes an instruction register, 2 an operation unit, 3 a general-purpose register, 4 an address addition circuit, 5 an address register for instruction fetch in advance, 6 an incrementer, 7, 8, 9-1, 9-2, 11, 14-1, 14-2 and 17 selector circuits, 10 a PSW register, 12 a memory unit, 13 a control circuit, 15 an instruction refetch address mode latch, 16 an operand refetch address queue, and 18 an operand refetch address register.

When the BASSM/BSM instruction is issued in the information processing apparatus shown in FIG. 2, the operation code portion OP as well as number specifying portions $R_1$ and $R_2$ of the general-purpose register are set in the instruction register 1. The general-purpose register 3 has 32 bits 0 to 31 as the bit width of the output data. Further, the address addition circuit 4 is used for calculating the address of a branch destination of the branch instruction, the operand address of an instruction, and the like. When the instruction address of the address of the branch destination or the like is calculated by the address adder circuit 4, its output bits 1 to 31 are transferred to the address register 5 for instruction fetch in advance via the selector circuit 11. When the address adder circuit 4 receives the contents of the general-purpose register specified by the register number specifying portion of the instruction register 1 as the input thereof and calculates the operand address, output bits 1 to 31 of the address addition circuit 4 are transferred to the operand fetch address register 18 via the selector circuit 17 to be stored therein and stored into one element of the operand refetch address queue 16.

In case of operand fetch synchronized to decoding of an instruction specifying the memory operand, i.e., a decode synchronization request, the output bits 1 to 31 of the above described address adder circuit 4 are selected by the selector circuit 17 and stored into the operand fetch address register 18. If this decode synchronization request is not accepted by the memory unit 12, the control circuit 13 issues a refetch request. It is assumed in the example shown in FIG. 2 that this refetch request is issued every three cycles. At the time of this refetch request, the operand refetch address is taken out from the operand refetch address queue 16 and transferred to the operand fetch address register 18 via the selector circuit 17.

Inputs of the address register 5 for instruction fetch in advance are connected to bits 1 to 31 of the address adder circuit 4 and the PSW register 10 as well as outputs of the incrementer 6 via selector 11. As for the output of the instruction preceding fetch address register 5, bits 1 to 31 are connected to the incrementer 6, whereas bits 1 to 7 are connected to the memory unit 12 via the selector circuit 7 and the selector circuit 9-2, and bits 8 to 31 are connected to the memory unit 12 via the selector circuit 9-2.

The incrementer 6 is a circuit for incrementing the contents of the register 5 according to the unit of instruction fetch in advance. In case the unit of instruction fetch in advance is 8 bytes, for example, the incrementer 6 increases the contents of the register 5 by 8.

Under the control of the instruction fetch control circuit 13, the selector circuit 9-2 functions to select either the output of the address register 5 for instructions to be fetched in advance or the output of the address adder circuit 4 supplied as the output of the selector circuit 11 as the instruction fetch address to be supplied to the memory unit 12. Under the control of the control circuit 13, the selector circuit 11 functions to select either bits 1 to 31 of the address adder circuit 4 or bits 1 to 31 of the PSW register 10 at the time of initial setting and select the incrementer 6 at the time of updating. Under the control of the control circuit 13, the selector circuit 14-2 functions to output either the contents of the general-purpose register 3 selected by the $R_2$ portion of the instruction register 1 or the output of the operation unit 2.

The PSW register 10 holds an address mode (in bit 0 in FIG. 2) and the instruction address of an instruction to be succeedingly executed (in bits 1 to 31 in FIG. 2). The control circuit 13 receives the operation code portion OP of the instruction as an input, decodes the OP, and controls the address register 5 for instruction fetch in advance, the selector circuits 9-2 and 11, and so on.

The instruction fetch address mode latch 15 controls the address mode at the time of instruction fetch, i.e., changeover of address width via the selector circuit 7. Further, the address mode in operand fetch is defined by the address mode bit of the PSW register 10, i.e., the value of bit 0 set by the output of the general-purpose register 3 or the output of the operation unit 2 via the selector circuit 14-1 and is controlled by the selector circuit 8.

As described above, the BASSM/BSM instruction, which is a mode changeover instruction, is an instruction of branch type. First of all, therefore, the operation of a common branch instruction, which has the same instruction format as that of the BASSM/BSM instruction and which does not contain the mode changeover operation, will now be described by referring to FIG. 2.

When the branch instruction is fetched from the memory unit 12 and set into the instruction register 1, the instruction decode stage is started. The instruction fetch control circuit 13 decodes the operation code which has been transmitted and sends out control signals to the address adder circuit 4, the selector circuit 9-2 and the selector circuit 11. At this time, the control signal for the selector circuit 9-2 is sent out via a selector circuit control section 9-1. On the basis of the contents of the general-purpose register 3 fetched by the general-purpose register number specifying portion $R_2$ of the instruction register 1, the address adder circuit 4 calculates the address of the branch destination. The selector circuit 11 selects the lines coming from the address adder circuit 4 and transfers the address of branch destination calculated by the adder circuit 4 to the memory unit 12. The control circuit 13 sends out an instruction fetch request signal to the memory unit 12 and starts refetch of the instruction of branch destination. Under the control of the control circuit 13, succeeding instructions are fetched from the memory unit 12 in accordance with the address successively updated by the address register 5 for instruction fetch in advance and the incrementer 6. This operation is continued until the next branch instruction or an instruction altering the instruction address portion of the PSW is set into the instruction register 1 and decoded or until the instruction register of the PSW is altered by an interrupt or the like.

The above described operation is started in synchronism with the decode stage of the branch instruction.

On the other hand, the contents of the PSW register 10 are updated to have an instruction address to be subsequently executed, in synchronism with the instruction execution stage. In case of a branch instruction, the contents of the general-purpose register specified by the $R_2$ portion of the instruction, (in other words, the address bits of branch destination) are set into bits 1 to 31 of the PSW register 10 via the operation unit 2 and the selector circuit 14-2 in synchronism with the execution stage.

The operation of a branch instruction does not involve a mode changeover operation. The address mode bit should be updated in synchronism with the instruction execution stage, because the address mode bit must not be altered until the execution of an instruction immediately preceding the mode changeover instruction is completed.

The operation of the BASSM/BSM instruction, which is a mode changeover instruction, will now be described.

These mode changeover instructions are instructions of a branch type and differ from the above described branch instruction in that succeeding instruction addresses, operand addresses and the like, inclusive of the address of branch destination, are controlled by the new address mode in case of mode changeover instructions. When a mode changeover instruction is to be executed, therefore, a preceding fetch of instructions of a new routine, inclusive of a fetch of the instruction of branch destination, must obey a new address mode specified by the mode changeover instruction.

In the information processing apparatus of the prior art, an instruction fetch latch 15 having contents updated in synchronism with decoding of the mode changeover instruction is provided in addition to an address mode bit latch having contents updated in synchronism with the execution stage of the mode changeover instruction. By controlling the instruction fetch address by means of the instruction fetch mode latch 15, instructions of branch destination can be fetched with higher speed with respect to the mode changeover instruction.

The operation of the mode changeover instruction will now be described by referring to FIG. 2.

When the mode changeover instruction is set into the instruction register 1, the instruction decoding stage is started. The control circuit 13 decodes the operation code transmitted thereto and performs the conventional operation of the decoding stage of a branch instruction already described. In addition, the control circuit 13 sends out a control signal for setting a new address mode bit, which is fetched from the general-purpose register 3 by using the $R_2$ portion of the instruction register 1, toward the instruction fetch address mode latch 15. When this instruction fetch address mode latch 15 is set, the selector circuits 7 and 8 are switched to an address mode specified by the mode changeover instruction. In synchronism with the decoding of the mode changeover instruction, therefore, the advance fetching of a train of instructions of link destination can be started in the same way as conventional branch instructions.

As a result, the information processing apparatus of the prior art shown in FIG. 2 can perform a fetch in advance of a train of instructions of branch destination concurrently with instruction decoding. At the execution stage of the mode changeover instruction, however, the operand fetch of the instruction of link destination, i.e., the decoding, is kept waiting until a changeover of the address mode indicated by bit 0 of the PSW register 10 is performed. This is achieved by the control circuit 13 which decodes the operation code of the BASSM/BSM instruction and performs control to effect the above described decoding waiting.

The operation of the prior art apparatus will now be described by referring to FIG. 4A. In the example shown in FIG. 4A, the instruction fetch IF is executed by a three-stage pipe line comprising decode Di, memory fetch Ai and transfer Li, and the operand fetch OF is executed by a four-stage pipe line comprising decode D, memory fetch A, transfer L and execution E.

In FIG. 4A, the instruction ① is an address mode changeover instruction At the same time that this instruction ① is decoded in cycle 1, refetch of the instruction of branch destination is started. An instruction ② of branch destination in this fetch of instruction of branch destination begins to be decoded concurrently with the above described instruction ①. In the cycle 3, the transfer of the instruction ② is finished. In the cycle 4, the instruction ② is ready to be decoded. However, this decoding is kept waiting until the operand fetch address mode is changed over, i.e., the execution stage of the address mode changeover instruction ① requiring three cycles because of the instruction of branch type is completed. In the example shown in FIG. 4A, decoding is performed in cycle 7. That is to say, performance deterioration of three cycles is caused in the above described prior art as a result of such delay in the decoding operation.

An embodiment of an information processing apparatus according to the present invention cleared of the above described problem of the prior art will be described with reference to FIG. 3.

Figure 3:
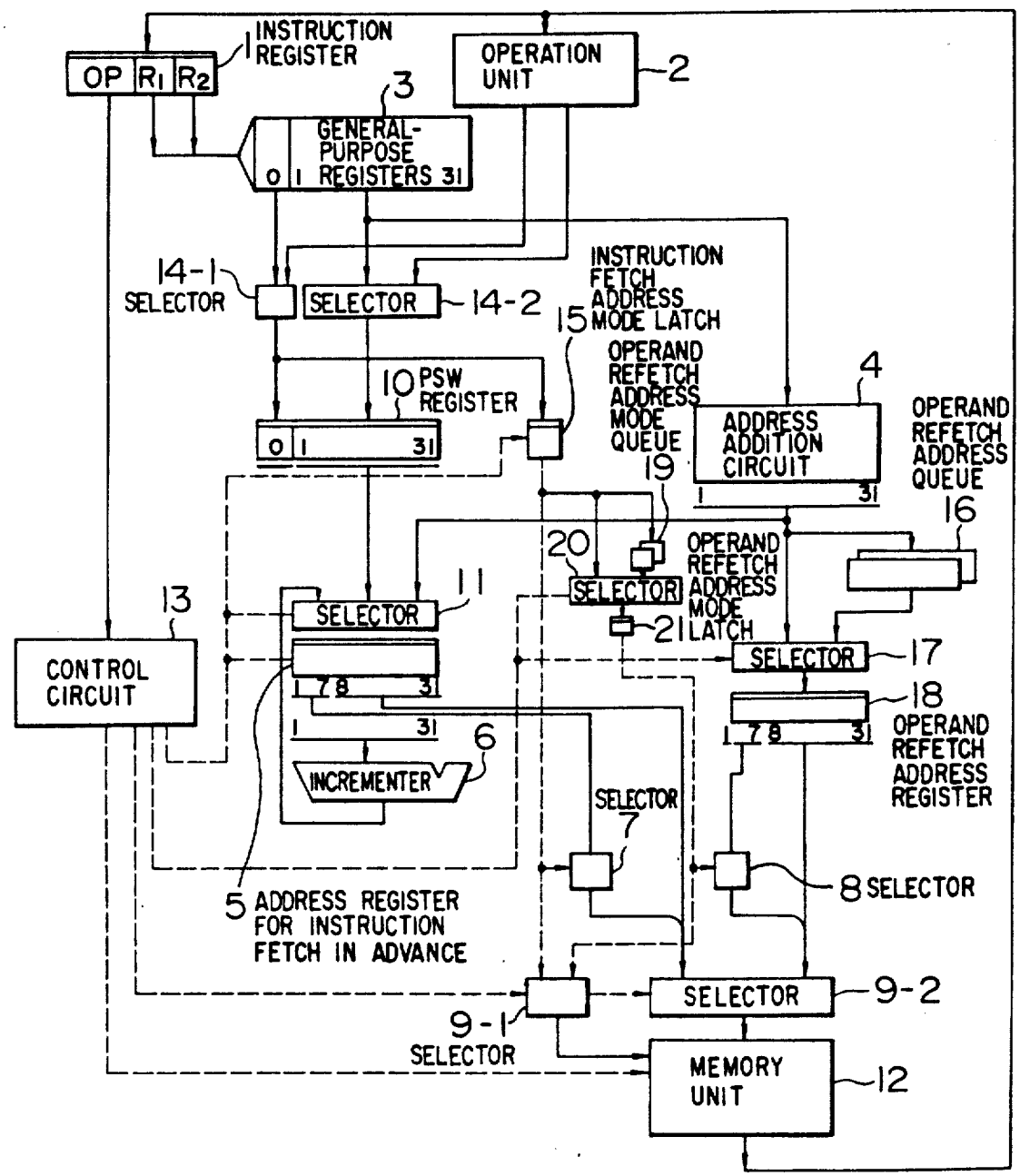
FIG. 3 shows the configuration of an embodiment of an information processing apparatus having an address expansion function according to the present invention.

FIG. 3 is a block diagram showing the configuration of an embodiment of an information processing apparatus according to the present invention. In FIG. 3, numeral 19 denotes an operand refetch address mode queue, 20 a selector circuit, and 21 an operand refetch address mode latch. Other numerals denote the same components as those of FIG. 2.

The embodiment of the present invention shown in FIG. 3 is characterized in that the operand refetch address mode queue 19, the selection circuit 20, and the operand fetch address mode latch 21 are provided in the information processing apparatus of the prior art shown in FIG. 2.

The operand refetch address mode queue 19 is provided corresponding to the operand fetch address queue 16. That is to say, when a decode synchronization request is issued during operand fetch, the operand fetch address supplied from the address addition circuit 4 is stored into the operand refetch address queue 16. Concurrently therewith, an address mode indicated by the instruction fetch address mode latch 15 is stored into the refetch address mode queue 19.

When an operand refetch request is issued, an address and an address mode are taken out from the operand refetch address queue 16 and the operand refetch address mode queue 19, respectively. This address is set into the operand fetch address register 18 via the selector circuit 17, and the address mode is set into the address mode latch 21 via the selector circuit 20.

The instruction fetch address mode latch 15 is controlled in the same way as the prior art shown in FIG. 2. That is to say, this instruction fetch address mode latch 15 memorizes the address mode. Upon an address mode changeover instruction, the content of the latch 15 is updated to have a new address mode in synchronism with instruction decoding. Also, fetch of the instruction of link destination in advance is performed by using this instruction fetch address mode latch 15. As for the operand fetch of the instruction of link destination as well, a new address mode is set into the instruction fetch address mode latch 15 in synchronism with decoding of the address mode changeover instruction, and hence the address mode can be defined by using this instruction fetch address mode latch 15.

The selection circuit 20 selects the instruction fetch address mode latch 15 when a decode synchronization request is issued, and selects the operand refetch address mode queue 19 when an instruction refetch request is issued, and its address mode is set into the operand fetch address mode latch 21. This address mode latch 21 assures the address mode at the time of refetching the operand, resulting in a raised instruction processing speed.

The instruction processing flow in the above described embodiment of the present invention will now be described by referring to FIG. 4B.

In FIG. 4B, the instruction fetch IF and the operand fetch OF are executed in the same way as FIG. 4A. In the embodiment of the present invention, decoding of the instruction ② of link destination of the address mode changeover instruction ① can be executed in cycle 4 as shown in FIG. 4B. Therefore, execution of this instruction can be started in cycle 7. As for the execution performance of the address mode changeover instruction, processing of one instruction needs six cycles in case of the prior art as shown in FIG. 4A, whereas processing of one instruction effectively needs three cycles in case of the embodiment of the present invention as shown in FIG. 4B, the performance being largely improved.

Another example of the flow of instruction processing will now be described by referring to FIGS. 5A and 5B.

FIG. 5A shows the instruction processing flow in case of the prior art, whereas FIG. 5B shows the instruction processing flow in case of the embodiment of the present invention. In FIGS. 5A and 5B, ① denotes an instruction preceding the address mode changeover instruction, whereas ② denotes an address mode changeover instruction and ③ denotes an instruction of link destination. FIGS. 5A and 5B show the case where the operand fetch (data synchronization request) of the instruction ① is not accepted by the memory unit 12 at the time of cycle 1 and refetch is performed in cycle 4. The address mode is changed from A to B by the address mode changeover instruction. The operand of the instruction ① is fetched in accordance with the address mode A, and the operand of the instruction ② is fetched in accordance with the address mode B.

In case of the prior art shown in FIG. 5A, the instruction ① is not accepted by the memory unit, and it is refetched in cycle 4. As a result, the operand fetch of the instruction ② is started in cycle 4. Processing steps of decode D, memory fetch A, transfer L and execution E are successively executed, and execution of the instruction ② ends with cycle 10. Since the operand fetch of the instruction ③ of link destination is kept waiting until execution of the instruction ② is completed, this fetch is eventually started in cycle 11 and finished in cycle 14. That is to say, instruction processing performed under the condition described above needs 14 cycles in case of the prior art.

On the other hand, in case of the embodiment of the present invention as shown in FIG. 5B, decoding of the operand fetch of the instruction ② can be started following the decoding of operand fetch of the instruction ② in the same way as that described with reference to FIG. 4B. Therefore, the operand fetch of the instruction ③ can be completed in cycle 11. That is to say, the embodiment of the present invention ensures an address mode even when an operand is refetched. As a result, the processing speed can be improved.

The above described embodiment of the information processing apparatus according to the present invention comprises the address addition circuit 4 as a third means for performing operand fetch in synchronism with instruction decoding, the refetch address queue 16 as a fourth means for performing operand fetch again provided that the operand fetch performed by the third means cannot be immediately processed, and the selector circuit 17 as a fifth means for selecting either the operand fetch using the third means or the operand refetch using the fourth means in accordance with predetermined priority. The apparatus thus has address expanding function for changing over the address width of the instruction and operand. Further, the apparatus comprises the instruction fetch address mode latch 15 as a first means for controlling the address width of instruction fetch, the operand fetch address mode latch 21 as a second means for controlling the address fetch of the operand refetch, and the operand refetch address mode queue 19 as a sixth means for memorizing the address mode used in operand fetch by the third means and for outputting the address mode thus memorized in operand refetch by the fourth means. In accordance with the same directive as the selection directive supplied to the fifth means, either the address mode of the first means or the address mode of the sixth means is set into the second means to perform operand fetch.

We claim:

1. An information processing apparatus having an address expansion function comprising:
   a memory unit for storing therein instructions and operands;
   an instruction register connected to said memory unit for storing therein an instruction fetched from said memory unit;
   a plurality of general-purpose registers including registers designated by an instruction stored in said instruction register for storing therein an address mode and address of an instruction succeeding an instruction being now executed, said address mode indicating whether address expansion should be performed or not;
   an operation unit for generating an address mode and address of the succeeding instruction;
   address adder means connected to said general-purpose registers for receiving contents of a register included in said plurality of general-purpose registers specified by contents of said instruction register and for generating an instruction address of a branch destination and an operand address thereof, provided that said succeeding instruction is a branch instruction;

first latch means for storing an address mode specified by said general-purpose registers;

means for updating the contents of said first latch means to have an address mode of said succeeding instruction supplied from either said general-purpose register or said operation unit;

address generating means for an instruction fetched in advance, connected to receive an instruction address outputted from said address adder means, for generating an address of an instruction included in a train of succeeding instructions in a train of instructions of branch destination;

a unit for selecting an instruction address generated by said address adder means when fetching an instruction of a branch destination or an instruction address generated by said address generating means and for an instruction fetched in advance when fetching a succeeding instruction of a branch destination, for modifying the instruction address thus selected in accordance with the address mode stored in said first latch means, and for sending a modified instruction address to the memory unit;

an operand address register for storing therein an operand address generated by said address adder means;

an operand refetch address queue for storing an operand address generated by said address adder means for performing refetch in case an operand refetched from the memory unit is not accepted;

a first selector unit for selecting an operand address generated by said address adder means when fetching an operand or the address stored in said operand refetch address queue when refetching an operand and for supplying the selected address to said operand address register;

second latch means connected to said first latch means for storing therein an address mode from said first latch means which is used when performing operand fetch or operand refetch;

an operand refetch address mode queue connected to said first latch means and for storing therein an address mode stored in said first latch means when first performing a fetch by using each operand address stored in the operand refetch address queue, in correspondence to said each operand address;

a second selector unit connected to said first latch means and said operand refetch address mode queue for selecting the address mode stored in said first latch means when fetching and operand or the address mode stored in said operand refetch address mode queue corresponding to the refetch operand address when refetching an operand and for supplying the selected address mode to said second address latch means; and a unit associated with said operand address register and said second latch means for modifying the operand address stored in said operand address register in accordance with the address mode stored in said second latch means and for sending the modified result to said memory unit for operand fetch and refetch.

2. An information processing apparatus according to claim 1, wherein when an address mode changeover instruction of branch type is fetched into said instruction register, fetching of an instruction of branch destination in advance is started in synchronism with decoding of said address mode changeover instruction.

3. An information processing apparatus according to claim 2, wherein operand fetch for an instruction of branch destination is capable of being carried out before completion of execution of the address mode changeover instruction.

* * * * *